(12) United States Patent
Bennett et al.

(10) Patent No.: US 11,448,582 B2
(45) Date of Patent: Sep. 20, 2022

(54) METHOD AND SYSTEM FOR NON-INTRUSIVELY DETERMINING PROPERTIES OF DEPOSIT IN A FLUIDIC CHANNEL

(71) Applicant: HALLIBURTON ENERGY SERVICES, INC., Houston, TX (US)

(72) Inventors: David B. Bennett, Conroe, TX (US); Oluwatosin Ogundare, Katy, TX (US); Claudio Olmi, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 299 days.

(21) Appl. No.: 16/885,386

(22) Filed: May 28, 2020

(65) Prior Publication Data

US 2021/0190665 A1 Jun. 24, 2021

Related U.S. Application Data

(60) Provisional application No. 62/950,642, filed on Dec. 19, 2019.

(51) Int. Cl.
*G01N 15/00* (2006.01)
*G01N 15/08* (2006.01)
*G01N 19/02* (2006.01)
*B08B 9/027* (2006.01)

(52) U.S. Cl.
CPC ............. *G01N 15/08* (2013.01); *B08B 9/027* (2013.01); *G01N 19/02* (2013.01)

(58) Field of Classification Search
CPC ......... G01N 19/00; G01N 19/02; G01M 3/00; G01M 3/24; G01M 3/26; G01M 3/36; B08B 9/02
See application file for complete search history.

(56) References Cited

U.S. PATENT DOCUMENTS

| | | | |
|---|---|---|---|
| 5,207,271 A | 5/1993 | Sanchez et al. | |
| 6,886,406 B1 * | 5/2005 | Couet | E21B 47/085 |
| | | | 73/1.49 |
| 6,993,963 B1 | 2/2006 | Gudmundsson | |
| 2004/0261505 A1 | 12/2004 | Di Lullo et al. | |

(Continued)

FOREIGN PATENT DOCUMENTS

| | | | | |
|---|---|---|---|---|
| FR | 3001162 A1 * | 7/2014 | ............... | B08B 3/12 |
| WO | 0029711 A1 | 5/2000 | | |
| WO | WO-2009051495 A1 * | 4/2009 | ............. | B08B 9/027 |

OTHER PUBLICATIONS

International Search Report, Response and Written Opinion, PCT Application No. PCT/US2020/037535, dated Sep. 25, 2020.

(Continued)

*Primary Examiner* — Nguyen Q. Ha
(74) *Attorney, Agent, or Firm* — Novak Druce Carroll LLP

(57) ABSTRACT

A method is provided for non-intrusively determining deposits of a fluidic channel. The method includes creating a pressure pulse in a fluidic channel. The method also includes sensing, by one or more sensors, reflections of the pressure pulse; and obtaining, from the one or more sensors, a measured pressure profile based on the sensed reflections of the pressure pulse. A processor then can determine one or more properties of the deposit in the fluidic channel based on the measured pressure profile.

20 Claims, 11 Drawing Sheets

(56) References Cited

U.S. PATENT DOCUMENTS

2016/0199888 A1* 7/2016 Jaaskelainen ........... G01M 3/00
                                                                          73/592

OTHER PUBLICATIONS

Richardson, Alan, "Seismic Full-Waveform Inversion Using Deep Learning Tools and Techniques", Ausar Geophysical; Published Jan. 2018.
Rostron, Paul, "Critical Review of Pipeline Scale Measurement Technologies", Department of Chemistry, Institute of Petroleum, Khalifa University of Science and Technology; Indian Journal of Science and Technology, vol. 11(17); May 2018.
Krynkin, A. et al., "A non-invasive acoustical method to measure the mean roughness height of the free surface of a turbulent shallow water flow", Review of Scientific Instruments 85, 114902 (2014); https://doi.org/10.1063/1.4901932; Nov. 24, 2014.

* cited by examiner

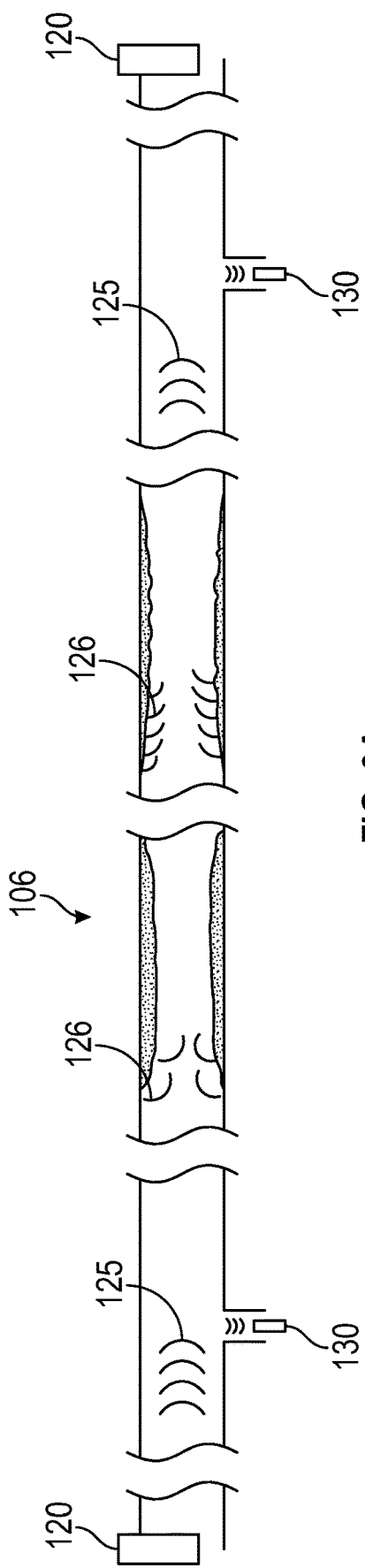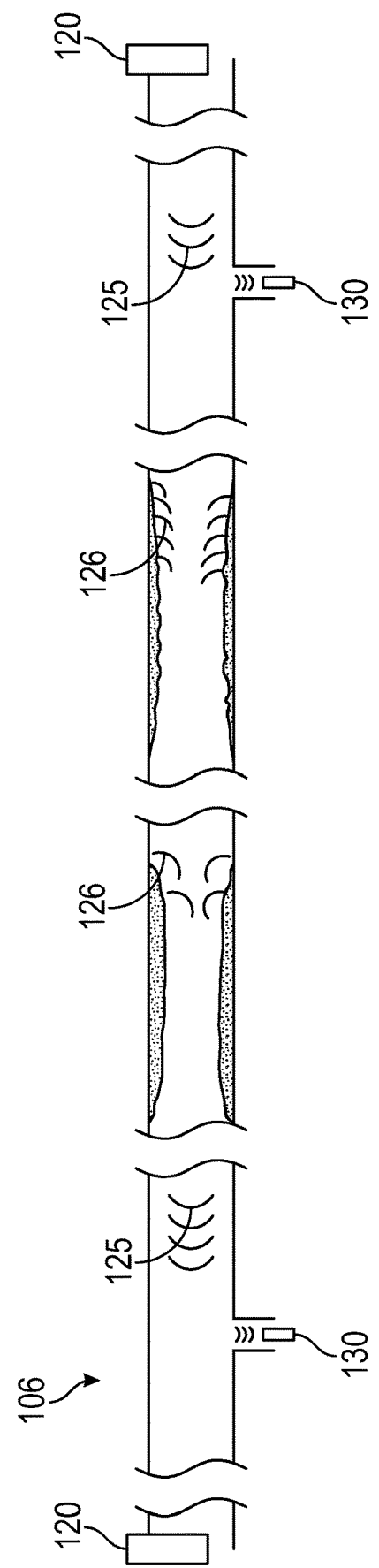
FIG. 9A
FIG. 9B

METHOD AND SYSTEM FOR NON-INTRUSIVELY DETERMINING PROPERTIES OF DEPOSIT IN A FLUIDIC CHANNEL

CROSS-REFERENCE TO RELATED APPLICATION

This application claims the benefit of U.S. Provisional Patent Application No. 62/950,642, filed in the U.S. Patent and Trademark Office on Dec. 19, 2019, which is incorporated herein by reference in its entirety for all purposes.

FIELD

The present disclosure relates generally to a system and method to determine deposit in a fluidic channel. In at least one example, the present disclosure relates to a system and method to non-intrusively determine properties of deposits in a fluidic channel.

BACKGROUND

Wellbores are drilled into the earth for a variety of purposes including tapping into hydrocarbon bearing formations to extract the hydrocarbons for use as fuel, lubricants, chemical production, and other purposes. These hydrocarbons are often transmitted to processing plants via pipelines. Fluidic channels such as pipelines and wellbores need to be inspected to determine issues such as leaks, blockages by deposits, or structural erosion or damage.

Operators face issues regarding maintaining flow over the life of a well or a pipeline. For example, a wide variety of materials can precipitate out of pipelines and wells, regardless of whether they are subsea tie in points or long distance transport pipelines. Failure to treat or remediate them can result in restriction and blockage of the line over time. With over 2.5 million kilometers of pipelines worldwide and over 1 million wells, management and treatment of issues that restrict flow, block lines, or damage integrity help maintain pipeline and well integrity, as well as provide a safe working environment.

Many methods for monitoring the integrity of fluidic channels are intrusive, such as using pigs. Deposits are also sometimes detected with the use of chemical testing, sensor networks, ultrasound scanning, trace chemicals or materials, tomography, acoustic or piezoelectric monitoring, and/or pigging. These methods can entail considerable investments in money and time.

BRIEF DESCRIPTION OF THE DRAWINGS

Implementations of the present technology will now be described, by way of example only, with reference to the attached figures, wherein:

FIGS. 9A and 9B are schematic diagrams of a system for determining deposit properties by inducing pressure pulses from opposing sides of the deposits.

DETAILED DESCRIPTION

Figure 1A:
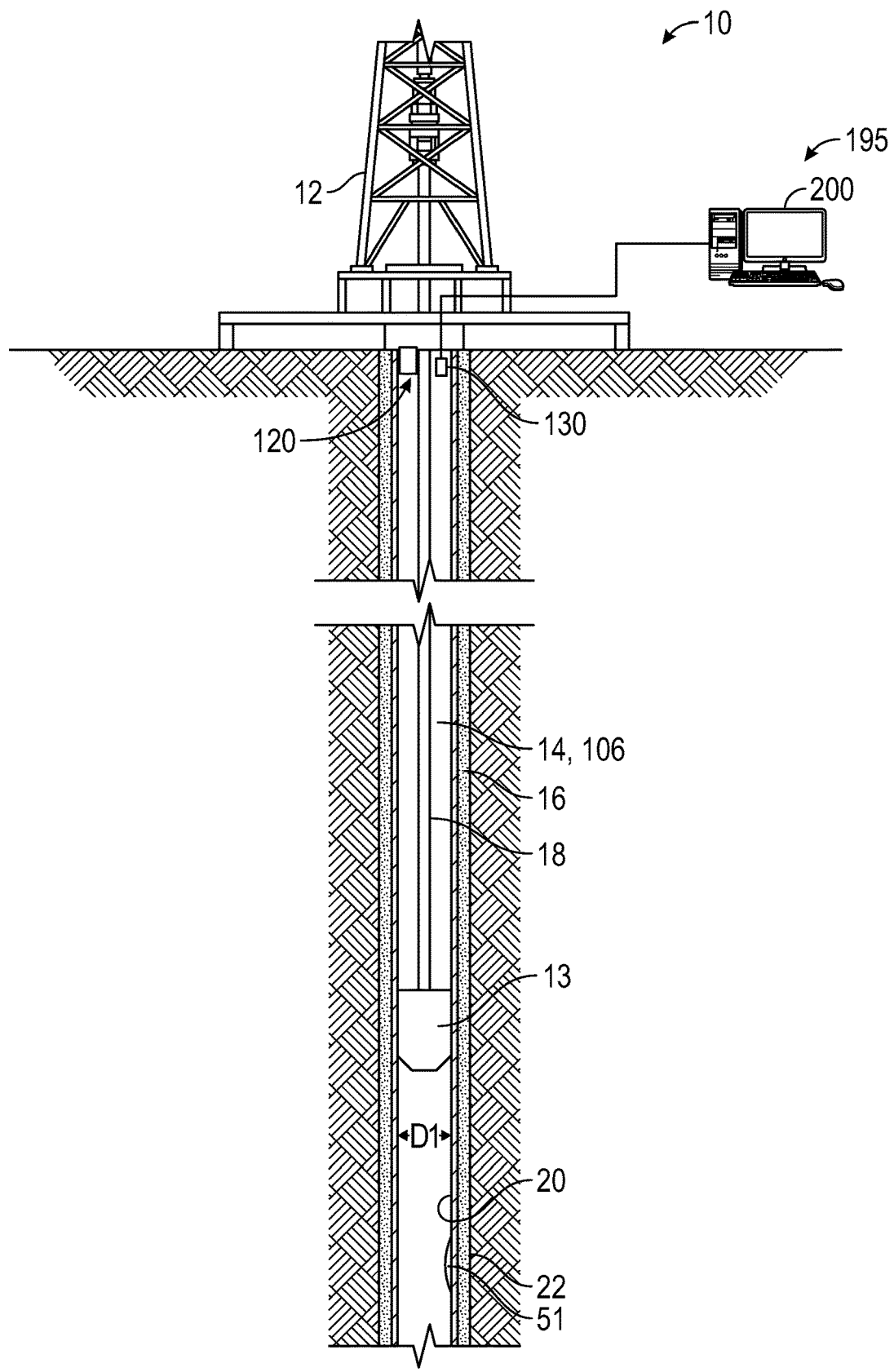
FIG. 1A is a schematic diagram of an exemplary environment for a system for determining deposit properties in a fluidic channel according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

This disclosure includes non-intrusive methodologies that, given a deposit's location in fluidic channel such as a pipeline or well, can determine the basic properties of the deposit based on its physical attributes without the deployment of intrusive devices or placement of devices on the pipeline or well casing. This can enable better decisions to be made based on an understanding of not only deposit location, but deposit type using cost effective equipment that can be deployed and maintained on site for periodic inspections and reviews. The disclosed methods may avoid the need for deployment of equipment along a pipeline or wellbore's length to capture data or injection and monitoring of material into the production flow of the fluidic channel. By non-intrusively determining the properties of the deposits, delays which can result in loss of revenue from reduced or halted product flows, or cost multiple millions of dollars per pipeline segment or well treated with ineffective chemical or physical treatments can be avoided. Quick identification of these precipitates without costly deployment of multiple resources can enable a shorter delay in decisions regarding the effective treatments and enable superior maintenance of targeted flow rates.

The ability to identify deposit type without requiring deployment of equipment or sensors along the pipeline or wellbore length represents a major step forward and will support application of subsequent treatments in a manual or automated methodology.

The system can utilize acoustic or pressure waves induced by one or more pressure devices and measured by one or more sensors to characterize a variety of potential deposit properties which will be required for identification of various deposit types. The properties can include, for example:

Porosity
Permeability
Elasticity

Darcy-Weisbach friction factor
Reynolds number
Surface roughness

Analysis of these properties in conjunction with knowledge of the deposit's location and an ideal simulated model can provide identification of deposit material profile for support of treatment decisions.

Figure 1B:
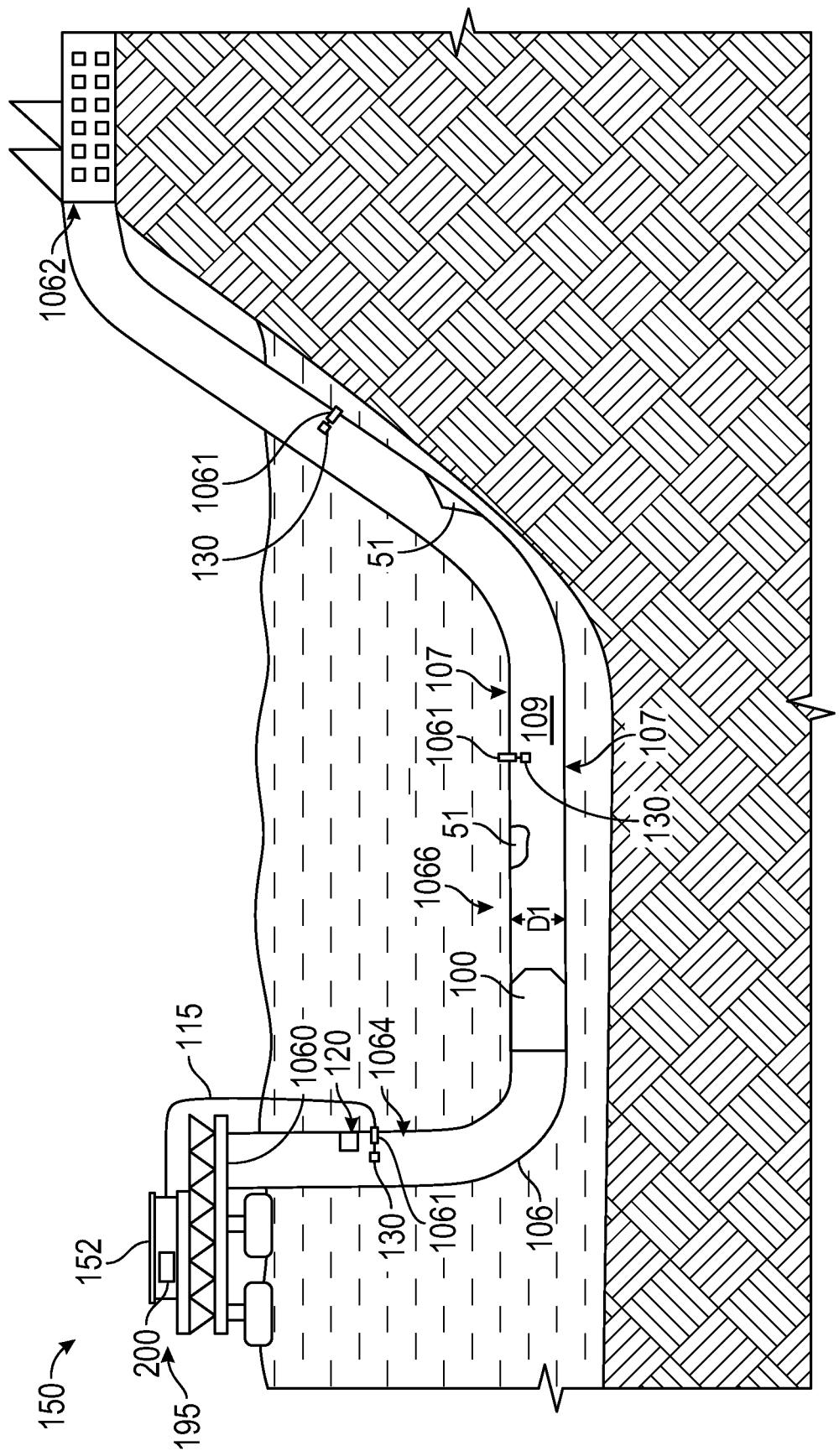
FIG. 1B is a schematic diagram of another exemplary environment for a system for determining deposit properties in a fluidic channel according to the present disclosure.
Figure 1C:
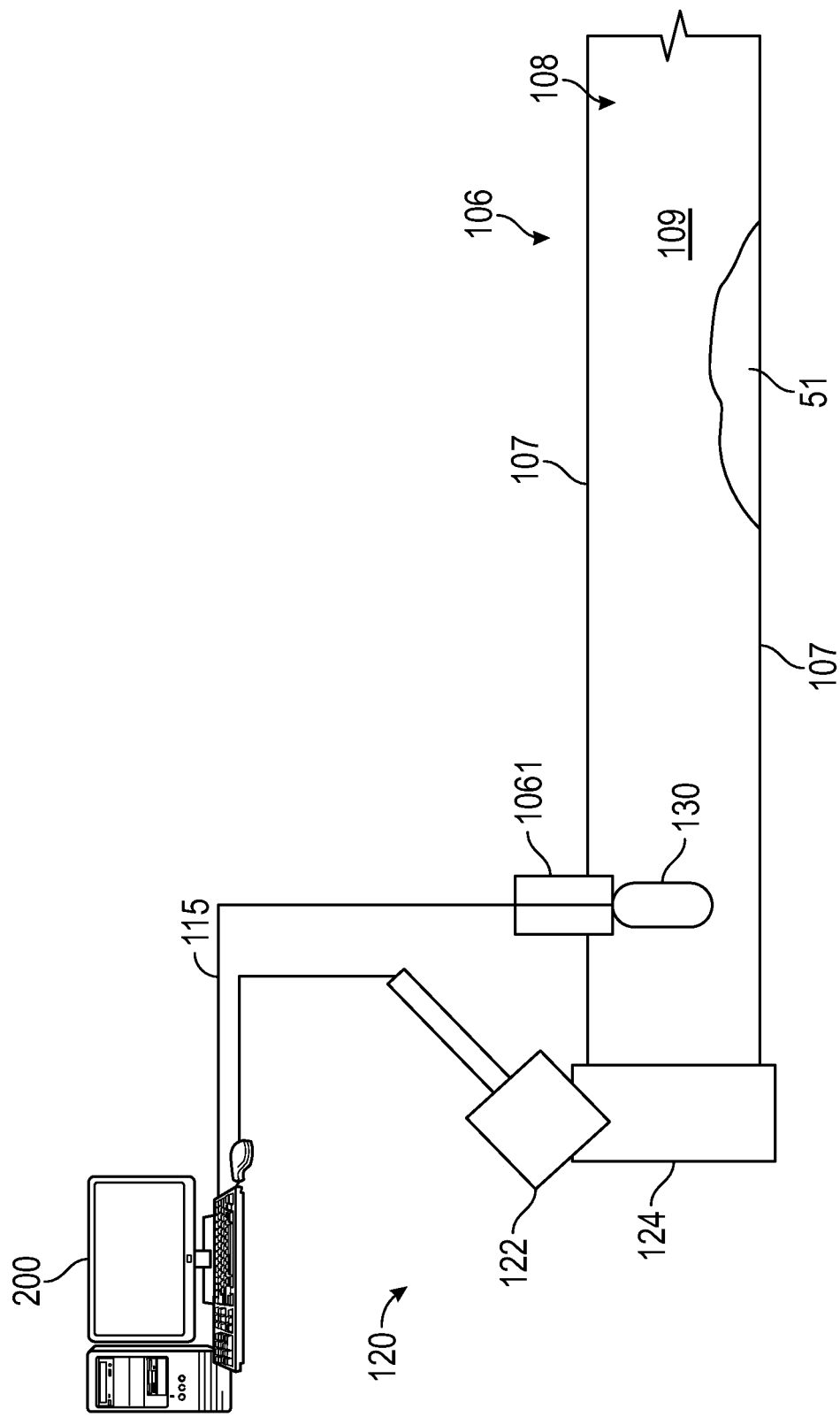
FIG. 1C is a schematic diagram of a system for determining deposit properties in a fluidic channel.

The method can be employed in pressure device 120 utilized in an exemplary system shown, for example, in FIGS. 1A-1C. In at least one example, for example as illustrated in FIG. 1A, the system can be employed in an exemplary wellbore environment 10. The environment 10 includes a drilling rig 12 extending over and around a fluidic channel 106, such as a wellbore 14 in FIG. 1A. The wellbore 14 is within an earth formation 22 and has a casing 20 lining the wellbore 14, the casing 20 is held into place by cement 16.

A conduit 18 can be disposed within the wellbore 14. In at least one example, the fluidic channel 106 can include the conduit 18. The conduit 18 can include, for example, tubing-conveyed, wireline, slickline, work string, joint tubing, jointed pipe, pipeline, coiled tubing, and/or any other suitable means for conveying a downhole device 13 into a fluidic channel 106 such as a wellbore 14. In some examples, the conduit 18 can include electrical and/or fiber optic cabling for carrying out communications. The conduit 18 can be sufficiently strong and flexible to tether the downhole device 13 through the wellbore 14, while also permitting communication through the conduit 18 to one or more of the processors, which can include local and/or remote processors. Moreover, power can be supplied via the conduit 18 to meet power requirements of the downhole device 13. For slickline or coiled tubing configurations, power can be supplied downhole with a battery or via a downhole generator.

A data acquisition system 195 includes one or more sensors 130 communicatively coupled with the controller 200 which can receive and/or process the data received from the sensors 130. While FIG. 1A illustrates one sensor 130, in other examples, more than one sensor 130 may be utilized. In at least one example, as illustrated in FIG. 1A, one or more sensors 130 can be disposed within the fluidic channel 106 at predetermined locations. The sensor 130 is positioned to measure pressure in the fluidic channel 106. Additionally, the sensor 130 may measure parameters related to the wellbore 14 and/or fluid in the wellbore 14, such as flow rate, temperature, and/or composition. In some examples, additional sensors 130 may measure additional parameters related to the wellbore 14 and/or the fluid in the wellbore 14 such as flow rate, temperature, and/or composition. In at least one example, sensor 130 can be disposed within the wellbore 14, for example coupled with or disposed in the casing 20, as illustrated in FIG. 1A.

It should be noted that while FIG. 1A generally depicts a land-based operation, the principles described herein are equally applicable to operations that employ floating or sea-based platforms and rigs, without departing from the scope of the disclosure. Also, even though FIG. 1A depicts a vertical wellbore, the present disclosure is equally well-suited for use in wellbores having other orientations, including horizontal wellbores, slanted wellbores, multilateral wellbores or the like.

FIG. 1B illustrates a pressure device 120 deployed with and/or in a fluidic channel 106 such as a pipeline. The fluidic channel 106, as illustrated in FIG. 1B, has a first end 1060 and a second end 1062. In other examples, the fluidic channel 106 can include any suitable channel through which fluid flows. Each of the first end 1060 and the second end 1062 can be open such that the first and second ends 1060, 1062 are accessible by an operator and fluid can flow through the open ends. In other examples, the second end 1062 of the fluidic channel 106 can be closed such that fluid cannot flow through the second end 1062. In at least one example, the first and second ends 1060, 1062 can be located along any point of the fluidic channel 106. For example, the first end 1060 may be located in the middle of the fluidic channel 106. The first end 1060 is any entry point to gain access to the fluidic channel 106. As illustrated in FIG. 1B, the fluidic channel 106 can have a vertical section 1064 and a horizontal section 1066. In other examples, the fluidic channel 106 can extend only in one direction or multiple directions along any axis.

The fluidic channel 106 has walls 107 which form an interior passage 109 through which fluid 108 can be contained in and flow. The fluid 108 can be one fluid or more than one fluid. The fluid 108 can include, for example, water and/or oil. The fluid 108 can also substantially fill the entire fluidic channel 106. In other examples, the fluid 108 can partially fill the fluidic channel 106. The walls 107 of the fluidic channel 106 can form a cross-sectional shape such as substantially circular, ovoid, rectangular, or any other suitable shape. The walls 107 of the fluidic channel 106 can be made of any combination of plastics or metals, suitable to withstand fluid flow without corrosion and with minimal deformation.

The fluidic channel 106 can also include one or more ports 1061. The ports 1061 extend through the walls 107 of the fluidic channel 106. As such, the ports 1061 permit communication across the walls 107 from external the fluidic channel 106 to the interior passage 109 within the fluidic channel 106.

The system 100 includes a data acquisition system 195 which receives and processes data such that the data can be used and interpreted by a user. The data acquisition system 195 is located in a data center 110, which can be proximate to the first end 1060 of the fluidic channel 106. The data center 110 may be above ground, under water, underground, or located at any point to collect data. For example, the data center 110 may be an underwater vehicle such as a submarine. In other examples, the data center 110 may be located on a platform, as illustrated in FIG. 1B.

Referring to FIGS. 1A-1C, along the fluidic channel 106, deposits 51 of the fluidic channel 106 may form. The deposits 51 can be any material disposed in the fluidic channel 106 of any amount and in any shape and form to at least partially impede flow of the fluid. For example, in some areas, the deposits 51 may completely block the interior passage 109 of the fluidic channel 106. Additionally, the deposits 51 may be to such an extent as to cause structural damage such as cracks in the walls 107 of the fluidic channel 106. Deposits can be, for example, wax deposits, clay deposits, or any other possible deposits that can adhere to the walls 107 of the fluidic channel 106 such that the fluid flow is at least partly impeded. For example, the deposits can include wax, precipitant such as asphaltenes, and/or scale.

In some areas, the fluidic channel 106 may not have any deposits 51. For example, the cross-sectional shape of the fluidic channel 106 can be substantially circular or any other desired shape as discussed above. In yet other areas, the fluidic channel 106 may have deposits 51. The change in shape of the fluidic channel 106 by the deposits 51 can cause the cross-sectional shape of the fluidic channel 106 to be substantially ovoid, rectangular, diamond, triangular, irregular, or any other possible shape other than the original shape of the fluidic channel 106. As illustrated in FIG. 1C, the illustrated portion of the fluidic channel 106 has one portion with deposits 51. In other examples, the fluidic channel 106 can be more than one portion with deposits 51. In yet other examples, the fluidic channel 106 may not have any portions with deposits 51.

As the fluid flows through the fluidic channel 106 from a portion without deposits 51 through a portion with deposits 51, the fluid may experience turbulent flow. In at least one example, the fluid may be prevented from flowing across the portion of the fluidic channel 106 with deposits 51.

To obtain the measured profile, and inspect the fluidic channel 106 in a non-intrusive manner, at least one pressure pulse can be induced. Referring to FIGS. 1A-1C, to induce the pressure pulses, a pressure device 120 can be used. The pressure device 120 can be actuated to create a pressure pulse that travels through the fluidic channel 106 at the local speed of sound in the medium. In at least one example, the pressure device 120 is not a permanent fixture or attachment. As such, the pressure device 120 can be coupled to the fluidic channel 106 only when needed to create pressure pulses. In other examples, the pressure device 120 can be a permanent fixture in the fluidic channel 106. In at least one example, the pressure device 120 can include a valve which can close to create a pressure pulse, an injector to inject fluid into a fluidic channel, and/or a hydrophone projector. The type of mechanism for the pressure device 120 to create the pressure pulse can be determined based on the type of fluid and/or the type of fluidic channel 106.

For example, as illustrated in FIG. 1C, the pressure device 120 can include a hydrophone projector, and can include one or more hammers 122 and a collar 124 coupled with the hammers 122. The collar 124 can be configured to couple externally with the walls 107 of the fluidic channel 106. The collar 124, for example, can wrap around the walls 107 of the fluidic channel 106 to secure the pressure device 120 to be in contact with and external of the fluidic channel 106. As such, to actuate a pressure pulse with the pressure device 120, the pressure device 120 is not deposited within the interior passage 109 of the fluidic channel 106. The pressure device 120 is non-intrusive, as the pressure device 120 is positioned external to the fluidic channel 106.

The pressure device 120 can be actuated and create the pressure pulse by the one or more hammers 122 striking and impacting the external surface of walls 107 of the fluidic channel 106. The hammers 122 can be electrical, mechanical, pneumatic, and/or hydraulic hammers. The hammers 122 can be any suitable object which can strike and impact the external surface of the walls 107, thereby creating a pressure pulse within the fluidic channel 106. For example, the hammers 122 can be any blunt object which does not damage the walls 107 of the fluidic channel 106 as the hammers 122 impact the walls 107. When the hammers 122 strike the walls 107, an acoustic pressure pulse is generated that travels upstream of the pressure device 120. The pressure device 120 can be electrically programmed, such that different pressures can be induced based on the strikes of the hammers 122. The harder the impact of the hammers 122 against the walls 107, the greater, or sharper, the pressure pulse. The striking of the hammers 122 against the walls 107 provides for a pulse with a higher resolution.

As the pressure pulse travels along the fluidic channel 106, any encountered obstructions or deposits 51 generate a reflected signal which is reflected back toward the pressure device 120. The system 100 includes a sensor 130 to receive the reflected pressure pulse signals. The sensor 130 can be a known distance from the pressure device 120. The sensor 130 can be a pressure transducer. In other examples, the sensor 130 can be any suitable sensor that measures pressure or stress of the fluid, for example a string gauge or an optical fiber transducer. The sensor 130 can be disposed within the interior passage 109 of the fluidic channel 106. For example, the sensor 130, as illustrated in FIG. 1C, can be mounted to and/or inserted through a port 1061 of the fluidic channel 106. The port 1061 may be pre-existing, so the fluidic channel 106 does not need to be modified or disrupted to position the sensor 130. In other examples, the sensor 130 can be disposed external to the fluidic channel 106.

The reflected signals received by the sensor 130 are passed through a transmission system 115 to a data acquisition system 114 to be interpreted to map out and quantify any deposits 51 in the fluidic channel 106. The data acquisition system 114 can be located at the surface, within a vehicle such as a submarine, or any other suitable location such that the data can be interpreted by an operator. The transmission system 115 can be wireline, optical fiber, wirelessly such as through the cloud or Bluetooth, or any other suitable method to transmit data. In at least one example, the transmission system 115 can additionally be coupled with the device 122 to send/receive instructions and/or data from the device 122.

Figure 2:
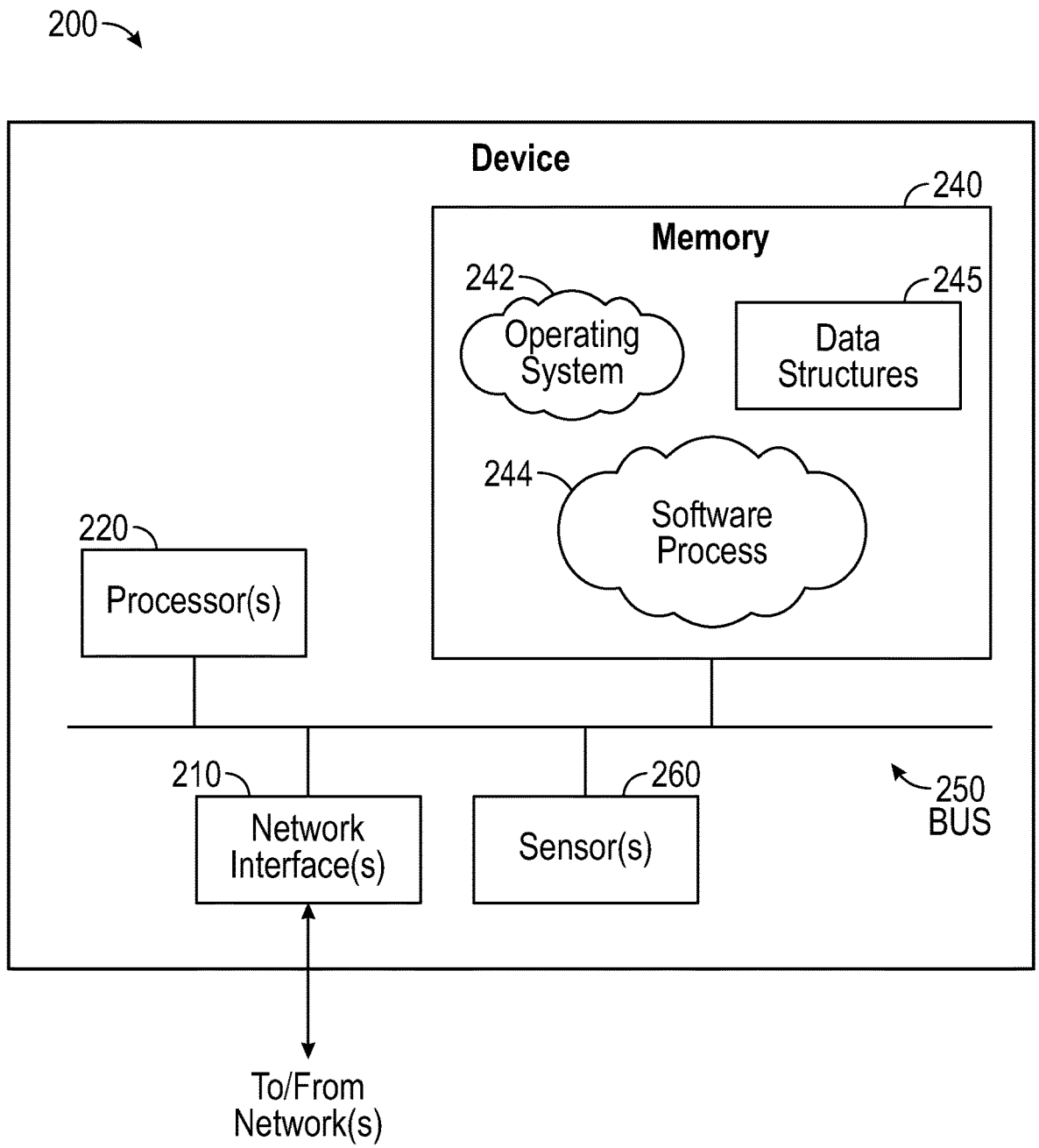
FIG. 2 is a schematic diagram of a data acquisition system which may be employed as shown in FIGS. 1A-1C.

FIG. 2 is a block diagram of an exemplary controller 200. Controller 200 is configured to perform processing of data and communicate with the sensors 130, for example as illustrated in FIGS. 1A-1C. In operation, controller 200 communicates with one or more of the above-discussed components and may also be configured to communication with remote devices/systems.

As shown, controller 200 includes hardware and software components such as network interfaces 210, at least one processor 220, sensors 260 and a memory 240 interconnected by a system bus 250. Network interface(s) 210 can include mechanical, electrical, and signaling circuitry for communicating data over communication links, which may include wired or wireless communication links. Network interfaces 210 are configured to transmit and/or receive data using any variety of different communication protocols.

Processor 220 represents a digital signal processor (e.g., a microprocessor, a microcontroller, or a fixed-logic processor, etc.) configured to execute instructions or logic to perform tasks in a wellbore environment. Processor 220 may include a general purpose processor, special-purpose processor (where software instructions are incorporated into the processor), a state machine, application specific integrated circuit (ASIC), a programmable gate array (PGA) including a field PGA, an individual component, a distributed group of processors, and the like. Processor 220 typically operates in conjunction with shared or dedicated hardware, including but not limited to, hardware capable of executing software and hardware. For example, processor 220 may include elements or logic adapted to execute software programs and manipulate data structures 245, which may reside in memory 240.

Sensors 260, which may include sensors 130 as disclosed herein, typically operate in conjunction with processor 220 to perform measurements, and can include special-purpose processors, detectors, transmitters, receivers, and the like. In this fashion, sensors 260 may include hardware/software for generating, transmitting, receiving, detection, logging, and/or sampling magnetic fields, seismic activity, and/or acoustic waves, or other parameters.

Memory 240 comprises a plurality of storage locations that are addressable by processor 220 for storing software programs and data structures 245 associated with the embodiments described herein. An operating system 242, portions of which may be typically resident in memory 240 and executed by processor 220, functionally organizes the device by, inter alia, invoking operations in support of software processes and/or services 244 executing on controller 200. These software processes and/or services 244 may perform processing of data and communication with controller 200, as described herein. Note that while process/service 244 is shown in centralized memory 240, some examples provide for these processes/services to be operated in a distributed computing network.

Other processor and memory types, including various computer-readable media, may be used to store and execute program instructions pertaining to the fluidic channel evaluation techniques described herein. Also, while the description illustrates various processes, it is expressly contemplated that various processes may be embodied as modules having portions of the process/service 244 encoded thereon. In this fashion, the program modules may be encoded in one or more tangible computer readable storage media for execution, such as with fixed logic or programmable logic (e.g., software/computer instructions executed by a processor, and any processor may be a programmable processor, programmable digital logic such as field programmable gate arrays or an ASIC that comprises fixed digital logic. In general, any process logic may be embodied in processor 220 or computer readable medium encoded with instructions for execution by processor 220 that, when executed by the processor, are operable to cause the processor to perform the functions described herein.

Additionally, the controller 200 can apply machine learning, such as a neural network or sequential logistic regression and the like, to determine relationships between the reflected signals from the pressure pulses received by the sensors 130. For example, a deep neural network may be trained in advance to capture the complex relationship between the reflected acoustic wave and the pipeline internal diameter variation. This neural net can then be deployed in the estimation of properties of deposits. As such, the determination of location of deposits 51 and properties of the deposits 51 within a fluidic channel 106 can be more accurate.

Figure 3:
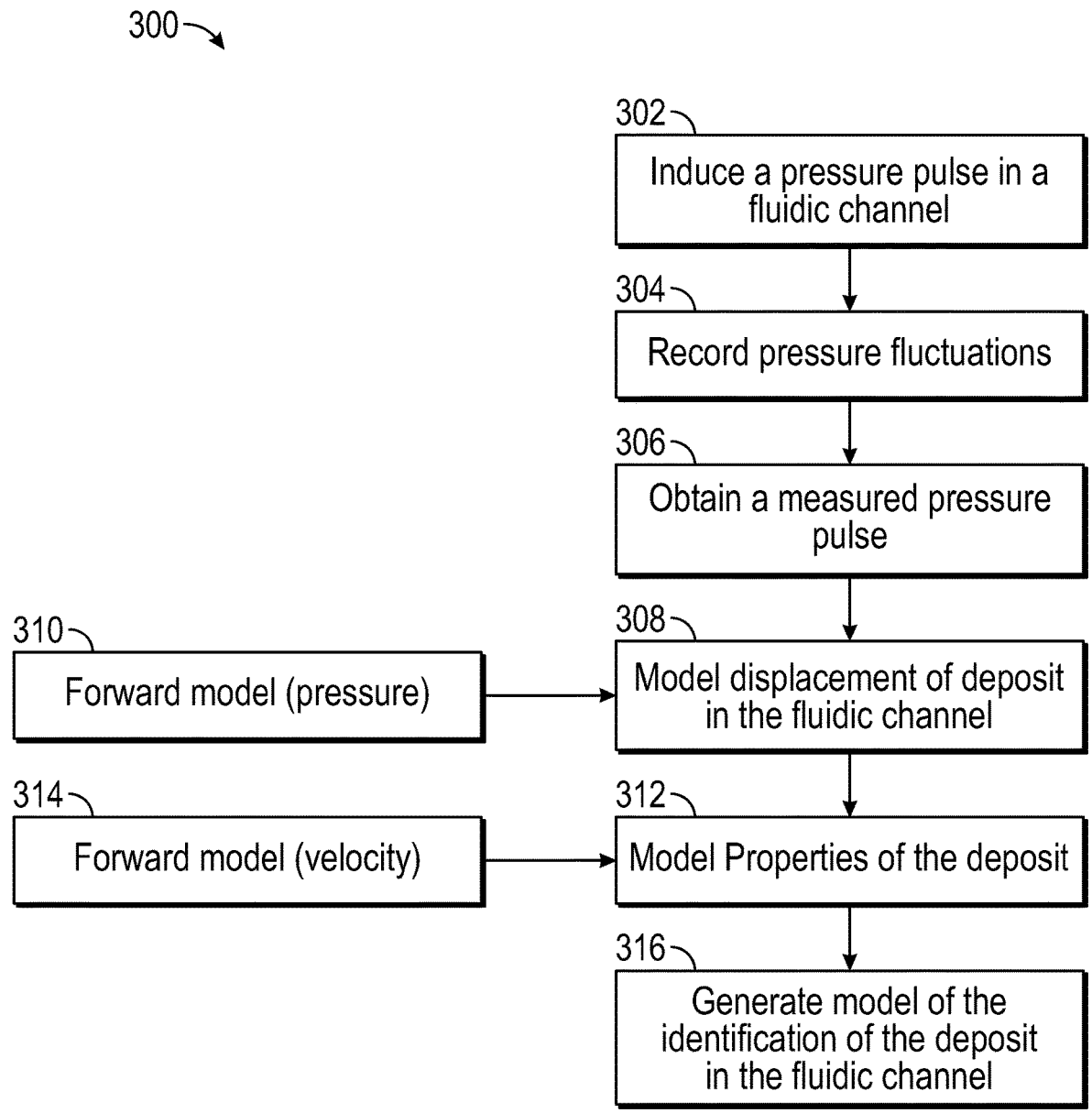
FIG. 3 is a flow chart of a method for generating a model of identification of deposits.

Referring to FIG. 3, a flowchart is presented in accordance with an example embodiment. The method 300 is provided by way of example, as there are a variety of ways to carry out the method. The method 300 described below can be carried out using the configurations illustrated in FIGS. 1A-2 and 4-9B, for example, and various elements of these figures are referenced in explaining example method 300. Each block shown in FIG. 3 represents one or more processes, methods or subroutines, carried out in the example method 300. Furthermore, the illustrated order of blocks is illustrative only and the order of the blocks can change according to the present disclosure. Additional blocks may be added or fewer blocks may be utilized, without departing from this disclosure. The example method 300 can begin at block 302.

At block 302, a pressure pulse is induced in a fluidic channel as described above. For instance, one or more pressure pulses can be induced. For example, a sequence of pressure pulses of differing sharpness can be induced. In other examples, the pressure pulses may all have the same sharpness. In yet other examples, only one pressure pulse is induced. The pressure pulse within the fluidic channel is induced by a pressure device. In at least one example, the pressure device can include a valve. By opening and closing the valve, a pressure pulse is induced. The faster the valve is closed, the sharper the pressure pulse. The pressure pulse travels upstream in the fluidic channel and reflects off of any obstructions such as deposits in the fluidic channel.

At block 304, the pressure fluctuations are then recorded by one or more sensors. The data is then transmitted to a controller to interpret the data.

At block 306, a measured pressure profile is obtained. The measured pressure profile, in some examples, can be provided as a diagram of pressure versus time. One or more pressure spikes are created by the pressure device inducing the pressure pulse, for example by the opening and closing of the valve. One or more pressure fluctuations can be detected which correspond to obstructions such as deposits in the fluidic channel.

At block 308, the displacement of the one or more deposits in the fluidic channel are modeled. To model the displacement of the deposits, a forward model of pressure measurements, at block 310, may be used. The model of the displacement of the one or more deposits in the fluidic channel is then generated based on the measured pressure profile. An example of modeling the displacement of the deposits in the fluidic channel is discussed in FIG. 4 below.

Figure 4:
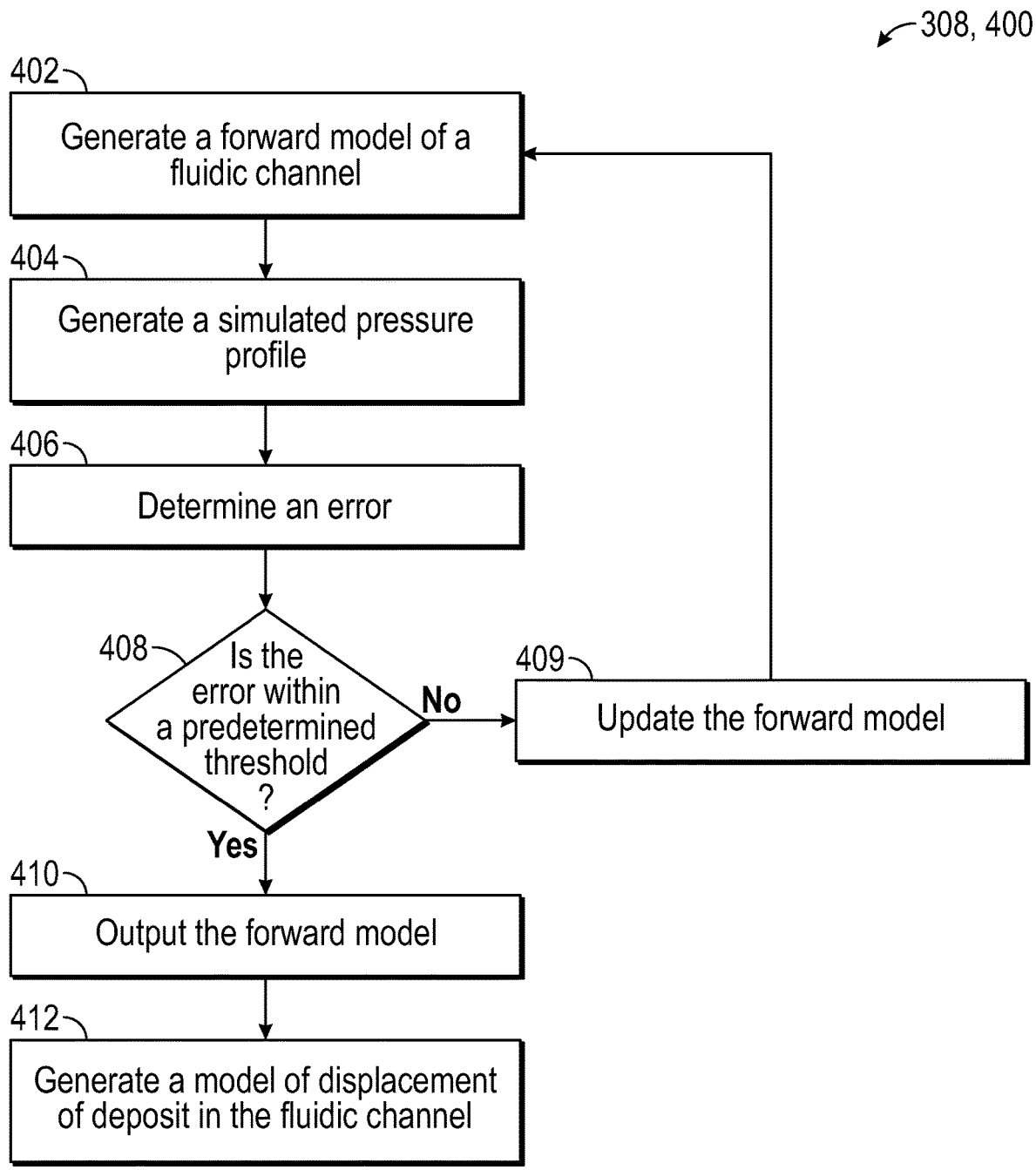
FIG. 4 is a flow chart of a method for generating a model of displacement of deposits.

Referring to FIG. 4, a flowchart is presented in accordance with an example embodiment. The method 400 is provided by way of example, as there are a variety of ways to carry out the method. The method 400 described below can be carried out using the configurations illustrated in FIGS. 1A-2 and 5-9B, for example, and various elements of these figures are referenced in explaining example method 400. Method 400 is an example which provides more detail to block 308 in FIG. 3. Each block shown in FIG. 4 represents one or more processes, methods or subroutines, carried out in the example method 400. Furthermore, the illustrated order of blocks is illustrative only and the order of the blocks can change according to the present disclosure. Additional blocks may be added or fewer blocks may be utilized, without departing from this disclosure.

At block 402, a forward model of the fluidic channel is generated. In at least one example, the forward model may be generated using water-hammer fluid dynamic equations, for example Jowkowsky equations or other suitable methods for calculating a forward model of a fluidic channel using a pressure pulse. While the cross-sectional shape of the fluidic channel can be based on ovality or circularity, any suitable shape can apply, and the calculations may be adjusted accordingly. An approximate expression for the change in pressure can be provided, for example, by the Jowkowski equations as:

$$\Delta P = \rho \times u \times a$$

u=flowrate
a=acoustic velocity
ρ=density

The propagating pressure pulse/wave is impacted by a change in the hydraulic diameter, which can translate to an increase in friction.

The differential pressure can be computed using the Darcy Weissbach equation as:

$$dp = f \times \left(\frac{L}{D}\right) \times \frac{\rho \times U^2}{2}$$

L = Pie Length

U = Flow Rate

-continued

D = Diameter f = Friction Factor

While the above equations are used to calculate the forward model from pressure changes, the above equations are exemplary. Other methods to calculate displacement of deposits in a fluidic channel from pressure changes can be used as applicable.

The forward model is based on the baseline simulation. The forward model incorporates an initial guess at displacement of deposits, or estimated displacement of deposits, at desired grid points. The grid points may be 1 meter, 10 meters, 20 meters, 100 meters, or any desired resolution. The initial guess at displacement of deposits includes, for example, any known displacement of deposits. The known displacement of deposits may be known because of previous experience or known displacement of deposits in the fluidic channel. The initial guess at displacement of deposits can also be set at 0, which provides that no cross-sectional variations are known.

The forward model can also incorporate a pressure inducement profile. The pressure inducement profile includes how the pressure device created a pressure pulse, for example, how fast the valve was closed and/or the sequences of opening and closing the valve. As such, the pressure inducement profile includes the known information of the pressure pulses and known reflections that would occur from any known displacement of deposits in the fluidic channel.

At block 404, a simulated pressure profile is generated from the forward model. The simulated pressure profile is a diagram of pressure versus time and reflects the initial pressure spike from the pressure device creating the pressure pulse and pressure fluctuations from the pressure pulse reflecting off of estimated displacement of the deposits in the fluidic channels.

At block 406, an error is determined. The error indicates an amount that the simulated pressure profile does not correspond to the measured pressure profile. To calculate the error, the measured pressure profile from the at least one sensor is utilized. The error is calculated based on the difference between the measured pressure profile and the simulated pressure profile. The error can be calculated using the equation:

Error=|measured pressure profile−simulated pressure profile|².

At block 408, the error is compared with a predetermined threshold. If the error is not within the predetermined threshold, the forward model is updated at block 409. The updated inputs (for example the displacement of the deposits as a function of range) to the forward model can be calculated using the equation:

Updated displacement=current displacement+function(error).

As such, the forward model is adjusted based on the error. The steps of generating a forward model 402, generating a simulated pressure profile 404, determining an error 606, determining whether the error is within, or less than, a predetermined error 408, and updating the forward model 409 are repeated until the error is within the predetermined threshold.

By basing the adjustments to the forward model on the error, the processing time can be reduced, for example, from 2 to 4 hours to 2 to 5 minutes on average.

If the error is within the predetermined threshold, then at block 410, the forward model is outputted. At block 412, a model of displacement of deposit in the fluidic channel is generated.

Figure 5:
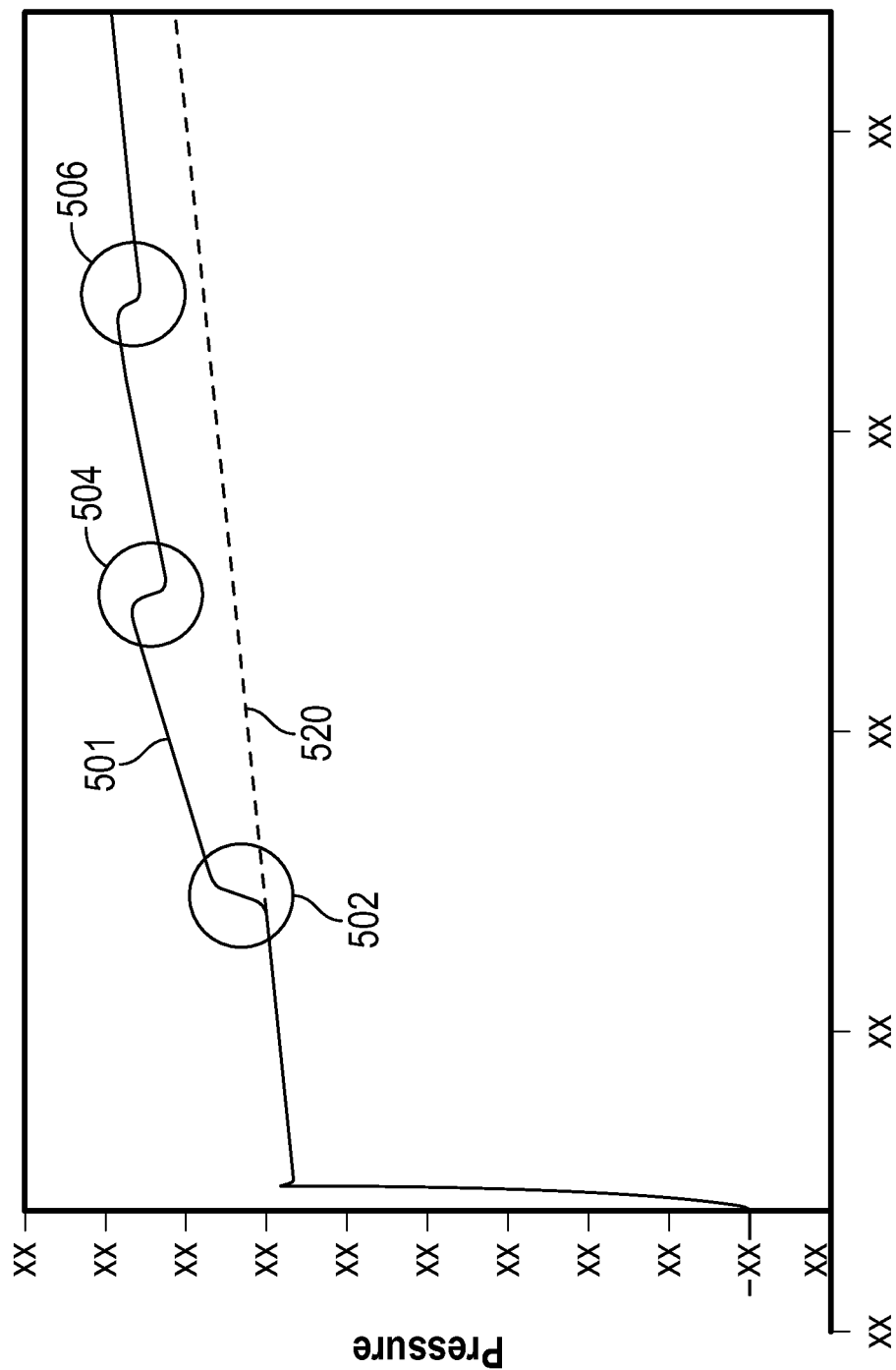
FIG. 5 is an exemplary diagram of a measured pressure profile.

For example, FIG. 5 illustrates a diagram 500 showing distances versus pressure. Line 501 illustrates a modeled pressure profile, and line 520 illustrates a baseline simulation. As can be seen in diagram 500, the baseline simulation 520 does not include any pressure spikes or pulses as the baseline simulation 520 is based on the concept of the fluidic channel not including any deposits. The modeled pressure profile 501 includes pressure spikes 502, 504, 506 at corresponding distances. The pressure spikes indicate that a deposit is located at those displacements.

Referring back to FIG. 3, with the displacement of the one or more deposits modeled, at block 312, the properties of the one or more deposits are modeled. To model the properties of the deposits at each modeled location, a forward model of the velocity of pressure pulses, at block 312, may be used. The properties can include, for example, porosity, permeability, elasticity, Darcy-Weisbach friction factor, Reynolds number, and/or surface roughness. An example of modeling the displacement of the deposits in the fluidic channel is discussed in FIG. 6 below.

Figure 6:
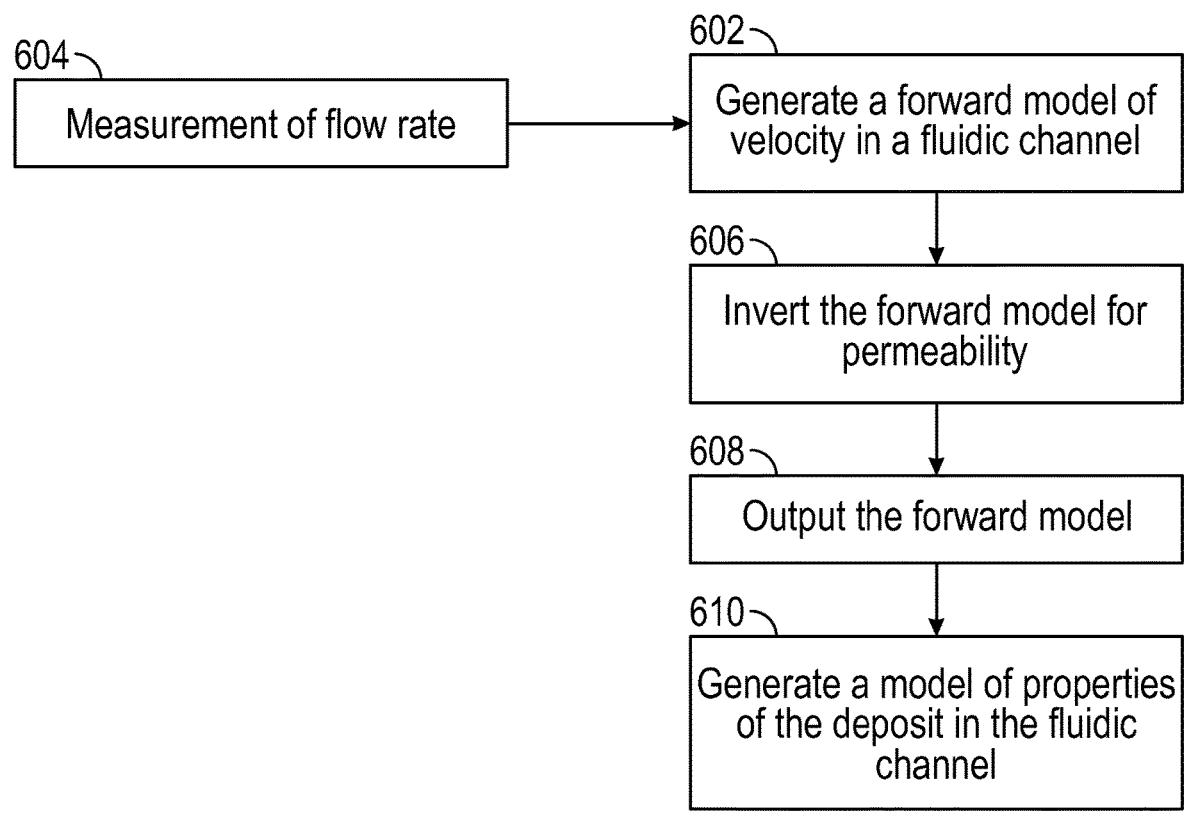
FIG. 6 is a flow chart of a method for generating a model of properties and identification of deposits.

Referring to FIG. 6, a flowchart is presented in accordance with an example embodiment. The method 600 is provided by way of example, as there are a variety of ways to carry out the method. The method 600 described below can be carried out using the configurations illustrated in FIGS. 1A-2 and 7A-9B, for example, and various elements of these figures are referenced in explaining example method 600. Method 600 is an example which provides more detail to block 312 in FIG. 3. Each block shown in FIG. 6 represents one or more processes, methods or subroutines, carried out in the example method 600. Furthermore, the illustrated order of blocks is illustrative only and the order of the blocks can change according to the present disclosure. Additional blocks may be added or fewer blocks may be utilized, without departing from this disclosure.

At block 602, a forward model reconstructing the velocity is combined with a measurement of flow rate 604. At block 606, an inversion of the model can be conducted for permeability, and the deposited compound can be identified.

Having established the position or displacement of the deposit in the fluidic channel as discussed above, in at least one example, the below equations can be used to model the properties of the deposit in the fluidic channel. For example, flow rate (q) can be calculated as:

$q = A\bar{v}$

Where A=hydraulic Cross Sectional Area
$\bar{v}$=Average Flow Velocity

In the region of deposit, the material deposit is also a function of:

(I) Material Permeability ($q_p$)
(II) Material Roughness ($\varepsilon$)

Figure 7A:
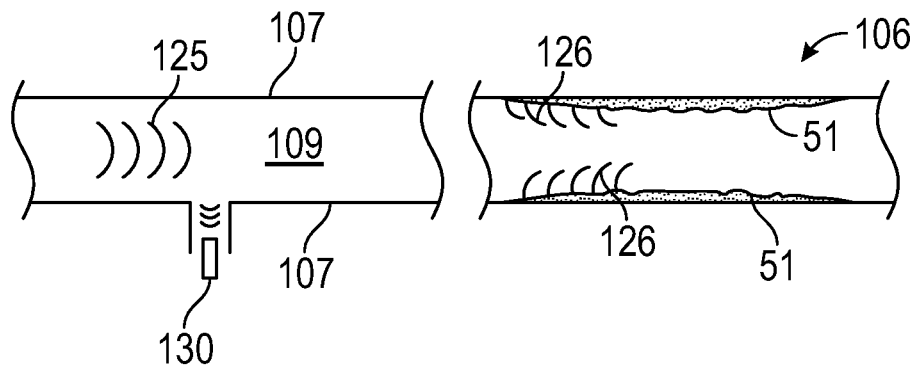
FIGS. 7A-7C are schematic diagrams of fluidic channels with deposits each having different roughness.
Figure 7B:
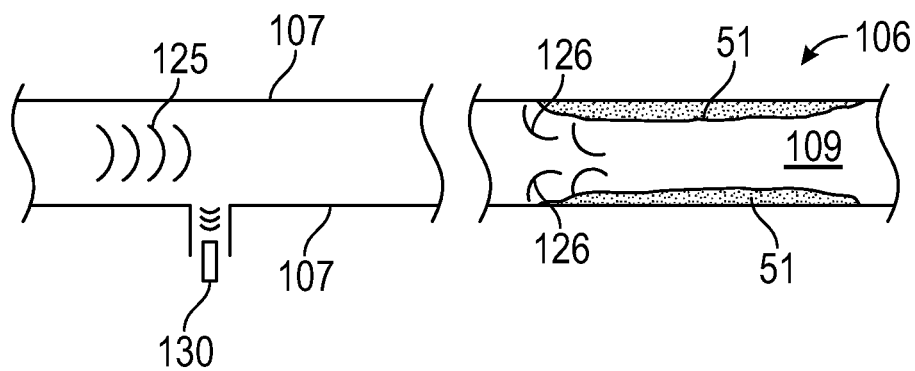
Figure 7C:
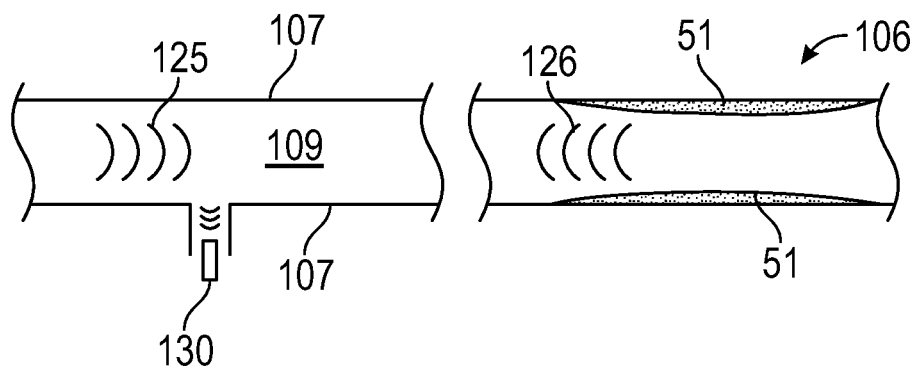
Figure 8:
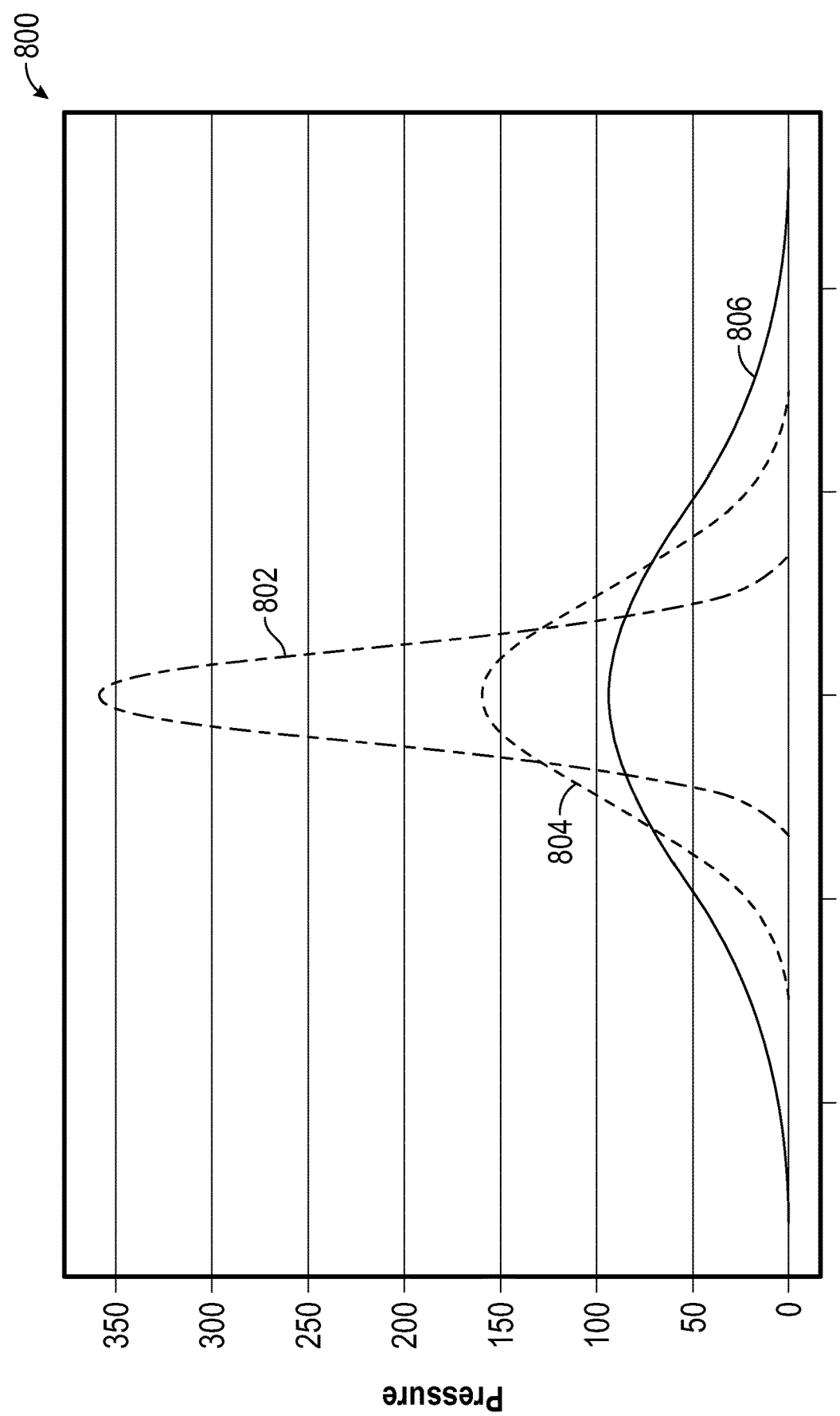
FIG. 8 is an exemplary diagram of measured pressure profiles in relation to roughness.

As illustrated in FIG. 7A, a deposit 51 is located along the walls 107 of a fluidic channel 106. The deposit 51 is impacted by a pressure pulse 125 and provides a reflection 126 of at least a portion of the pressure pulse 125 back towards the source such as the pressure device. A sensor 130 measures the reflections 126, and the controller 200 can calculate and model the properties of the fluidic channel. As illustrated in FIGS. 7A-7C, roughness of the deposit 51 can directly impact dispersion and reflection of the return wave signal 126. For example, FIG. 8 is a diagram 800 illustrating pressure measurements in relation to roughness. Line 802 illustrates low roughness, line 804 illustrates medium roughness, and line 806 illustrates high roughness.

The fluid velocity is impacted by the roughness of the material deposit in the region of deposit, for example as shown in FIGS. 7A-7C, and as a result, can impact the flow rate, q.

The permeability of a solid material can be provided as:

$$q_p = KA \frac{\Delta h}{L}$$

A=Cross sectional area of the deposited area (this is typically approximated from loss in volume, since the height of the deposit is known)
Δh=Difference in liquid levels
L=Length
K=Constant of Proportionality The permeability, $q_p$, can be a good differentiation in a finite set of material types, for example scale, sand, precipitant, asphaltene, and/or wax.

A mathematical forward model can be introduced that implements $$q = f(q_p, A, \bar{v}, \varepsilon)$$

Given a set of observations (flow rates):

$$Q = \{q_i\}_{\forall i \in \{0, \ldots, n\}}$$

Let Ø be such that:"

$$Ø_i = \{q_{pi}, A_i, \bar{v}_i, \varepsilon_i\}$$

and $$Ø = \{Ø_i\}_{\forall i \in \{0 \ldots, n\}}$$

A quadratic loss function can be introduced, such that:

$$L(Q, f(Ø)) = (Q - f(Ø))^2$$

such that:

$$L(Q, f(\emptyset)) = \sum_{i=0}^{n} [q_i - f(\emptyset_i)]^2$$

A function, g, can be introduced to invert for permeability such that:

$$g(Q) = \operatorname{argmin}_{q_p} L(Q, f(\emptyset))$$

In at least one example, for the calculated permeability, $q_p$, a Nearest Neighbor (NN) classifier can be introduced for all the possible types of deposits, such that the classes/types, Y, is a function of $q_p$. Therefore for a given $q_p \hat{Y}(q_P)$ is the predicted class/type associated with it, indicating the type of material deposit in the region of pipe.

$$\hat{Y}(q_p) = 1/m \sum_i y_i$$

$$q_{p_i} \in N_m(q_p)$$

where $N_m(q_p)$ is the neighborhood of a set of $\{q_p\}$ containing m elements closest to $q_{p_i}$. A threshold function can be used to assign $\hat{Y}(q_{p_i})$ to the nearest known material.

While the above equations are used to calculate the forward model from pressure changes, the above equations are exemplary. Other methods to calculate properties of deposits in a fluidic channel from pressure changes can be used as applicable.

Referring back to FIG. 6, at block 610, a model of properties of the deposit in the fluidic channel is generated.

Referring back to FIG. 3, based on the properties of the deposits, at block 316, a model of the identification of the one or more deposits at each of the displacement locations in the fluidic channel is generated. Accordingly, the model can provide not only the displacement of the one or more deposits, but can also provide the identification and/or properties of each of the deposits. For example, the model can provide that 250 meters from the sensor is a deposit that includes wax, precipitant such as asphaltenes, and/or scale.

As illustrated in FIGS. 9A and 9B, the source pressure wave 125 does not necessarily have to only come from one side of the deposit 51. In some cases, performing an analysis using pressure waves sourced from both sides of the deposit 51 in the fluidic channel 106 may be advisable or preferred. For example, when multiple deposits 51 are close to each other, such as in FIGS. 9A and 9B, one deposit 51 may hide another deposit 51 from the pressure pulse 125. Accordingly, by sending pressure pulses 125 in opposing directions, a more complete and accurate depiction of the location, shape, size, and/or properties of the deposits 51 can be determined.

In some examples, as illustrated in FIGS. 9A and 9B, a pressure device 120 may provided at opposing sides of the fluidic channel 106 in relation to the one or more deposits 51. One or more sensors 130 may be provided at opposing sides of the fluidic channel 106 corresponding with the pressure devices 120. Either separately or together, the pressure devices 120 can induce one or more pressure pulses 125 within the fluidic channel 106 from either side of the deposits 51. The pressure pulses 125 are then reflected off of the deposits 51, sending pressure reflections 126 back towards the respective pressure devices 120. The sensors 130 can then measure the pressure reflections 126 that are reflected off of the deposits 51. By obtaining pressure measurements of the deposits from both directions, a more accurate and complete model of the properties and/or identification of the deposits can be obtained.

After the model of deposits is generated and outputted, adjustments to the fluidic channel can be made. For example, the fluidic channel can be inspected at certain points with certain deposits. In other examples, the portion of the fluidic channel with deposits can be cleaned and/or replaced by any suitable method. For example, the controller can determine a cleaning process to remove the deposit from the fluidic channel based on the properties of the deposit. In some examples, the controller can initiate the cleaning process to remove the deposit from the fluidic channel. In some examples, the controller can initiate the cleaning process automatically without human assistance. In some examples, a user can begin the cleaning process by providing instructions to the controller. As the location and the identification and/or properties of each deposit in the fluidic channel is known, a more precise and targeted approach to address the deposits can be performed.

Numerous examples are provided herein to enhance understanding of the present disclosure. A specific set of statements are provided as follows.

Statement 1: A method to non-intrusively determine properties of deposits in a fluidic channel is disclosed, the method comprising: obtaining, from one or more sensors, a measured pressure profile based on a pressure pulse induced in a fluidic channel; and determining, by a controller, one or more properties of a deposit in the fluidic channel based on the measured pressure profile.

Statement 2: A method is disclosed according to Statement 1, wherein the one or more properties of the deposit in the fluidic channel include at least one of the following: porosity, permeability, elasticity, Darcy-Weisbach friction factor, Reynolds number, and/or surface roughness.

Statement 3: A method is disclosed according to Statements 1 or 2, further comprising: determining, by the controller, identification of the deposit in the fluidic channel based on the properties of the deposit.

Statement 4: A method is disclosed according to any of preceding Statements 1-3, further comprising: determining, by the controller, the location of the deposit in the fluidic channel based on the measured pressure profile.

Statement 5: A method is disclosed according to any of preceding Statements 1-4, further comprising: determining, by the controller, a cleaning process to remove the deposit from the fluidic channel based on the properties of the deposit.

Statement 6: A method is disclosed according to Statement 5, further comprising: removing, using the cleaning process, the deposit from the fluidic channel.

Statement 7: A method is disclosed according to any of preceding Statements 1-6, further comprising: actuating a pressure device to create the pressure pulse in the fluidic channel.

Statement 8: A method is disclosed according to Statement 7, wherein the pressure device includes one or more of the following: a valve which opens and/or closes, an injector which injects fluid into the fluidic channel, and/or a hydrophone projector.

Statement 9: A data acquisition system is disclosed comprising: one or more sensors operable to measure pressure in a fluidic channel; and a controller operable to: obtain, from the one or more sensors, a measured pressure profile based on a pressure pulse induced in the fluidic channel; and determine one or more properties of a deposit in the fluidic channel based on the measured pressure profile.

Statement 10: A data acquisition system is disclosed according to Statement 9, wherein the one or more properties of the deposit in the fluidic channel include at least one of the following: porosity, elasticity, Darcy-Weisbach friction factor, Reynolds number, and/or surface roughness.

Statement 11: A data acquisition system is disclosed according to Statements 9 or 10, wherein the controller is further operable to: determine identification of the deposit in the fluidic channel based on the properties of the deposit.

Statement 12: A data acquisition system is disclosed according to any of preceding Statements 9-11, wherein the controller is further operable to: determine the location of the deposit in the fluidic channel based on the measured pressure profile.

Statement 13: A data acquisition system is disclosed according to any of preceding Statements 9-12, wherein the controller is further operable to: determining a cleaning process to remove the deposit from the fluidic channel based on the properties of the deposit.

Statement 14: A data acquisition system is disclosed according to Statement 13, wherein the controller is further operable to: initiate the cleaning process to remove the deposit from the fluidic channel.

Statement 15: A data acquisition system is disclosed according to any of preceding Statements 9-14, wherein the controller is further operable to: actuate a pressure device to create the pressure pulse in the fluidic channel.

Statement 16: A data acquisition system is disclosed according to Statement 15: wherein the pressure device includes one or more of the following: a valve which opens and/or closes, an injector which injects fluid into the fluidic channel, and/or a hydrophone projector.

Statement 17: A system is disclosed comprising: a fluidic channel; a pressure device operable to create a pressure pulse in the fluidic channel; one or more sensors operable to measure pressure in the fluidic channel; and a controller operable to: obtain, from the one or more sensors, a measured pressure profile based on the pressure pulse induced in the fluidic channel; and determine one or more properties of a deposit in the fluidic channel based on the measured pressure profile.

Statement 18: A system is disclosed according to Statement 17, wherein the one or more properties of the deposit in the fluidic channel include at least one of the following: porosity, permeability, elasticity, Darcy-Weisbach friction factor, Reynolds number, and/or surface roughness.

Statement 19: A system is disclosed according to Statements 17 or 18, wherein the controller is further operable to: determine identification of the deposit in the fluidic channel based on the properties of the deposit.

Statement 20: A system is disclosed according to any of preceding Statements 17-19, wherein the controller is further operable to: determine the location of the deposit in the fluidic channel based on the measured pressure profile.

The disclosures shown and described above are only examples. Even though numerous properties and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the examples described above may be modified within the scope of the appended claims.

The invention claimed is:

1. A method to non-intrusively determine properties of deposits in a fluidic channel, the method comprising:
   obtaining, from one or more sensors, a measured pressure profile based on a pressure pulse induced in a fluidic channel; and
   determining, by a controller, one or more properties of a deposit in the fluidic channel based on the measured pressure profile.

2. The method of claim 1, wherein the one or more properties of the deposit in the fluidic channel include at least one of the following: porosity, permeability, elasticity, Darcy-Weisbach friction factor, Reynolds number, and/or surface roughness.

3. The method of claim 1, further comprising:
   determining, by the controller, identification of the deposit in the fluidic channel based on the properties of the deposit.

4. The method of claim 1, further comprising:
   determining, by the controller, the location of the deposit in the fluidic channel based on the measured pressure profile.

5. The method of claim 1, further comprising:
determining, by the controller, a cleaning process to remove the deposit from the fluidic channel based on the properties of the deposit.

6. The method of claim 5, further comprising:
removing, using the cleaning process, the deposit from the fluidic channel.

7. The method of claim 1, further comprising:
actuating a pressure device to create the pressure pulse in the fluidic channel.

8. The method of claim 7, wherein the pressure device includes one or more of the following: a valve which opens and/or closes, an injector which injects fluid into the fluidic channel, and/or a hydrophone projector.

9. A data acquisition system comprising:
one or more sensors operable to measure pressure in a fluidic channel; and
a controller operable to:
obtain, from the one or more sensors, a measured pressure profile based on a pressure pulse induced in the fluidic channel; and
determine one or more properties of a deposit in the fluidic channel based on the measured pressure profile.

10. The data acquisition system of claim 9, wherein the one or more properties of the deposit in the fluidic channel include at least one of the following: porosity, permeability, elasticity, Darcy-Weisbach friction factor, Reynolds number, and/or surface roughness.

11. The data acquisition system of claim 9, wherein the controller is further operable to:
determine identification of the deposit in the fluidic channel based on the properties of the depo sit.

12. The data acquisition system of claim 9, wherein the controller is further operable to:
determine the location of the deposit in the fluidic channel based on the measured pressure profile.

13. The data acquisition system of claim 9, wherein the controller is further operable to:
determining a cleaning process to remove the deposit from the fluidic channel based on the properties of the deposit.

14. The data acquisition system of claim 13, wherein the controller is further operable to:
initiate the cleaning process to remove the deposit from the fluidic channel.

15. The data acquisition system of claim 9, wherein the controller is further operable to:
actuate a pressure device to create the pressure pulse in the fluidic channel.

16. The data acquisition system of claim 15, wherein the pressure device includes one or more of the following: a valve which opens and/or closes, an injector which injects fluid into the fluidic channel, and/or a hydrophone projector.

17. A system comprising:
a fluidic channel;
a pressure device operable to create a pressure pulse in the fluidic channel;
one or more sensors operable to measure pressure in the fluidic channel; and
a controller operable to:
obtain, from the one or more sensors, a measured pressure profile based on the pressure pulse induced in the fluidic channel; and
determine one or more properties of a deposit in the fluidic channel based on the measured pressure profile.

18. The system of claim 17, wherein the one or more properties of the deposit in the fluidic channel include at least one of the following: porosity, permeability, elasticity, Darcy-Weisbach friction factor, Reynolds number, and/or surface roughness.

19. The system of claim 17, wherein the controller is further operable to:
determine identification of the deposit in the fluidic channel based on the properties of the deposit.

20. The system of claim 17, wherein the controller is further operable to:
determine the location of the deposit in the fluidic channel based on the measured pressure profile.

* * * * *